United States Patent [19]

Kropp et al.

[11] Patent Number: 4,742,676
[45] Date of Patent: May 10, 1988

[54] REVERSIBLE HYDROSTATIC TRANSMISSION PUMP WITH DRIVE ENGINE SPEED CONTROL

[75] Inventors: Walter Kropp, Sulzbach; Wolfgang Grone, Aschaffenburg, both of Fed. Rep. of Germany

[73] Assignee: Linde Aktiengesellschaft, Wiesbaden, Fed. Rep. of Germany

[21] Appl. No.: 808,614

[22] Filed: Dec. 13, 1985

[30] Foreign Application Priority Data

Dec. 24, 1984 [DE] Fed. Rep. of Germany ....... 3447406

[51] Int. Cl.⁴ ............................................. F16H 39/46
[52] U.S. Cl. ........................................ 60/432; 60/433; 60/434; 60/444; 91/400; 91/403
[58] Field of Search ....................... 60/431–434, 60/443–444; 91/394, 395, 400, 403; 137/625.66

[56] References Cited

U.S. PATENT DOCUMENTS

| | | | |
|---|---|---|---|
| 3,818,802 | 6/1974 | Wilson | 137/625.66 X |
| 4,400,939 | 8/1983 | Moranduzzo et al. | 60/444 X |
| 4,543,787 | 10/1985 | Eckhardt | 60/444 |
| 4,553,620 | 11/1985 | Eckhardt et al. | 60/444 X |
| 4,559,778 | 12/1985 | Krusche | 60/452 X |

FOREIGN PATENT DOCUMENTS 3326920 2/1984 Fed. Rep. of Germany.

*Primary Examiner*—Robert E. Garrett
*Assistant Examiner*—George Kapsalas
*Attorney, Agent, or Firm*—Buell, Ziesenheim, Beck & Alstadt

[57] ABSTRACT

A control device for a drive unit, preferably the drive unit of a power vehicle, is provided having a hydrostatic transmission where the adjusting device of the latter and the adjusting device of the internal combustion engine are controlled by means of a servo piston loaded by control pressure, whereby the internal combustion engine is prevented during reversing from being adjusted to an increased power output through a circuit before the adjusting device of the hydrostatic transmission has passed through the zero-stroke position, and where the circuit has two shut off valves whose outlets are connected with a line, which are connected to the spring-side pressure chamber of the operating cylinder of the internal combustion engine through a multiway valve.

5 Claims, 2 Drawing Sheets

REVERSIBLE HYDROSTATIC TRANSMISSION PUMP WITH DRIVE ENGINE SPEED CONTROL

BACKGROUND OF THE INVENTION

1. Field of the Invention

This invention relates to a control for a drive unit and particularly for the drive unit of a power vehicle, in particular, a scoop loader, with a primary power source, preferably a piston internal-combustion engine, in particular, a diesel engine.

2. Description of the Prior Art

The invention more particularly relates to a drive aggregate of a power vehicle such as a scoop loader with a primary power source having an adjusting device that is connected with a piston loaded with a control pressure in an operating cylinder and capable of sliding against the force of a spring and a hydrostatic transmission that is adjustable in both directions of output rotation and whose regulating unit is connected with a servo piston that is capable of sliding in an operating cylinder whose pressure loading is regulated by a control valve having a valve member connected with a receiver piston slidable in a receiver cylinder having two pressure chambers, one of which is capable of being loaded with an arbitrary control pressure and when the control pressure assigned to the primary power source is dependent upon the control pressure assigned to the hydrostatic transmission. Such a control that has proven well in practice is already known (DE-OS No. 30 35 152). Although it has proved out very well, there is one disadvantage in that in switching from one direction of output rotation to the other the exchange of control pressure from one side of the receiver cylinder to the other can occur more rapidly than the actual change in direction of output rotation due to the inertia of reversal of the regulating unit of the hydrostatic transmission. That is, a control pressure that is already considerably increased and is assigned to a certain direction of output rotation can be present, while the output shaft is actually still turning in the other direction. If the adjustment of the regulating unit of the primary power source is dependent only on the control pressure that acts on the transmission or is even dependent only on the adjustment of the actuation element with which the control pressure is actuated, the primary power source can thus be set at an increased power output while the transmission output shaft is actually still turning in the opposite direction.

SUMMARY OF THE INVENTION

The invention proposes to eliminate this disadvantage and to further refine the control device by providing an open shut-off valve that is controlled by the position of the adjusting device of the transmission and is open when the pressure chamber into which the receiving piston is shoved is loaded with pressure and connected to each of the two pressure chambers of the receiver cylinder whereby the outlets of the two shut-off valves are connected with a line that is connected to the spring side pressure chamber of the operating cylinder assigned to the primary power source so that the internal combustion engine is set at an increased power output only when the transmission output shaft is actually turning in the desired, i.e., imposed direction of rotation, in which case a special reversing valve is to be avoided, which would be conceivable in order to avoid a premature rise in the setting of the primary power source during an abrupt reversal to the other direction of rotation.

According to the invention, a simple and cost-favorable design of a device is offered, by means of which an increase in the setting of the primary power source is prevented so long as the adjusting device of the hydrostatic transmission has not yet reached the position determined by the control pressure newly imposed by the reversing process.

The problem posed is solved by connecting a shut-off valve controlled by the position of the regulating unit of the hydrostatic transmission to each of the two pressure chambers of the receiver cylinder. This valve is opened if the position of the adjusting device does not match the pressure loading, in which case the outlets of both shut-off valves are connected with a line through which the control pressure present in the receiver cylinder is conveyed to the spring-side pressure chamber of the operating cylinder assigned to the primary power source. It should be taken into account here that a control for a hydrostatic transmission that is adjustable in both directions of output rotation, where a setting control signal line is assigned to each direction of output movement and where a certain switching state is to be achieved only if there is a definite assignment of the direction of output movement and control pressure in one of the two lines, is known in itself (DE-OS No. 33 26 920). However, different relationships in another dependence are controlled for a different purpose in the known device The purpose of the shut-off valves according to the invention is that, if the transmission is still in a setting assigned to a certain direction of output rotation, but a control pressure that is assigned to another direction of output rotation has already built up, the operating cylinder assigned to the primary power source is loaded with pressure on the spring side and thus the regulating unit of the primary power source is adjusted in the direction to a small power output such that the primary power source is prevented from imparting an increased power to the transmission while the latter is still turning in the direction of rotation imposed during the previous operating process even though a switching process into the opposite direction of rotation has already been undertaken with regard to control pressure. In order to achieve this goal, an additional control pressure line is run to the operating cylinder of the hydrostatic transmission according to the invention. That is, in a drive unit in which both the hydrostatic transmission and the adjusting device of the internal combustion engine are regulated by control pressure a paralysis circuit is provided that prevents the power setting of the primary power source from being increased during the switch to the other direction of output rotation before the hydrostatic transmission has been moved through the neutral position into the newly imposed direction of output rotation, in which case a separate control pressure line (spur) leads to the operating cylinder of the diesel engine and control devices in the sense of an inhibiting logic are located in this spur.

An implementation of the receiver piston-receiver cylinder aggregate in which the receiver piston is designed as a plunger piston and is supported against a spring on both sides through a spring plate that lies against the receiver piston, where the spring plate is supported with an edge surface projecting over the outer periphery of the receiver piston against a flange edge of the housing is already known through the DE-OS No. 31 43 539. However, a particularly advantageous implementation form in which the components present in any case are utilized in a simple special implementation as the valves so that no special valves have to be incorporated is here provided wherein the spring plate present in any case is used as the valve check body, which can lie in front of the mouth of the line leading to the operating cylinder of the primary power source and effected in the form of a borehole through the housing and shut off this line in the state present in front of the mouth. This structural component, designated here as the housing, in which a bore that forms the receiver cylinder is located, can be designed in a special implementation as a cover for a control device, in which the functional components are incorporated.

In order to control such a receiver piston, a different pressure must thus prevail in front of the two end surfaces of same. This can occur by relieving the one side of pressure and loading the other side with the control pressure selected. However, this can also happen if one side is loaded with an imposed control pressure while the other side is loaded with a pressure having a prescribed constant level, in which case this prescribed pressure level is below or at least no higher than the minimum arbitrarily selectable control pressure. Such devices have many advantages, especially insofar as the prescribed constant minimum pressure can be simultaneously used for other purposes, such that an additional pump for generating this pressure additionally required is unnecessary. There are also more favorable conditions with respect to the restoring forces.

In the foregoing general description we have set out certain objects, purposes and advantages of this invention. Other objects, purposes and advantages of the invention will be apparent from a consideration of the following description and the accompanying drawings in which:

DESCRIPTION OF THE PREFERRED EMBODIMENTS

Figure 1:
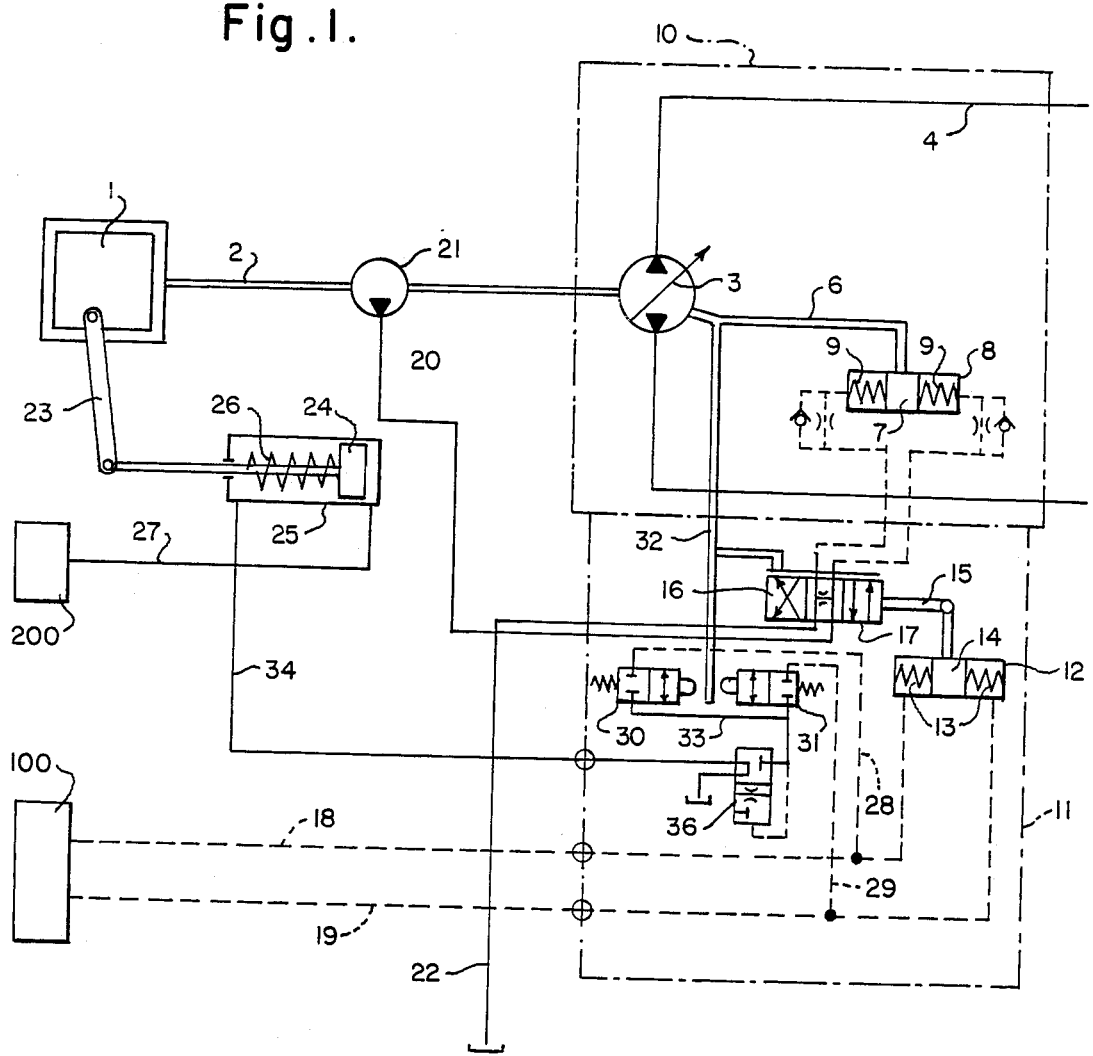
FIG. 1 shows a circuit diagram for a control device for a drive unit.

The diesel engine 1, used here as the primary power source, drives the pump 3 through the shaft 2; the pump 3 is connected through the lines 4 and 5 with a hydraulic motor (not shown) to form a hydrostatic transmission. The final control element 6 of the adjustable pump 3 is connected with a servo piston 7 that is capable of sliding in an operating cylinder 8 against the force of two springs 9. The pump 3 with the operating cylinder 8 is located in housing 10. The receiver cylinder 12 is located in the cover 11 placed on this housing 10. The receiver piston 14 is capable of sliding against the force of two springs 13 in this cylinder 12 and it is connected through a connecting link 15 with the pilot valve 16 of the servo valve 17, which is in turn connected with the final control element 6 of the pump 3 in the sense of a servo power amplification follow-up control. The two control pressure lines 18 and 19 go out from the control pressure sender 100 and each of them leads to a pressure chamber in the receiver cylinder 12. The mode of operation is as follows: if a higher pressure is built up in the control pressure line 18 than in the control pressure line 19, the receiver piston 14 is shifted under the action of this pressure to the right in the drawing against the force of the right-hand spring in the drawing and thus the valve slide 16 of the servo valve 17 is shifted so that the delivery line 20 of the constant pump 21 driven by the shaft 2 is connected with the left-hand pressure chamber in the operating cylinder 8 and the right-hand pressure chamber of this operating cylinder 8 is connected with the drain line 22. The final control element 6 of the pump 3 is thus shifted to the right in the drawing and thus imparts a prescribed setting position to the pump 3. Inversely, if the control pressure is fed into the line 19, one that is higher than the pressure prevailing in the line 18, similar displacements in the opposite direction accordingly occur.

The final control element 23 of the primary power source 1 is connected with a servo piston 24 that is capable of sliding in an operating cylinder 25 against the force of a spring 26. A control pressure line 27 is connected to the piston-side pressure chamber of the operating cylinder 25; it goes out from a control pressure sender 200, whose actuating element is in active connection with the actuating element of the control pressure sender (not shown) that loads one of the two lines 18 and 19. A branch line 28 is connected to the control pressure line 18 and a branch line 29 is connected to the control pressure line 19. The branch line 28 leads to a shut-off valve 30 and the branch line 29 leads to a shut-off valve 31. Both shut-off valves can be actuated by means of an arm 32, which is connected with the final control element 6 of the pump 3 and which leaves both valves 30 and 31 unaffected in its neutral position. A line 33 goes out from the two shut-off valves 30 and 31 and it comes together with a line 34 that leads to the spring-side pressure chamber of the operating cylinder 25. A 2-position/3-connection multiway valve 36 controlled by the pressure in the lines 33 is located in this line 34.

Figure 2:
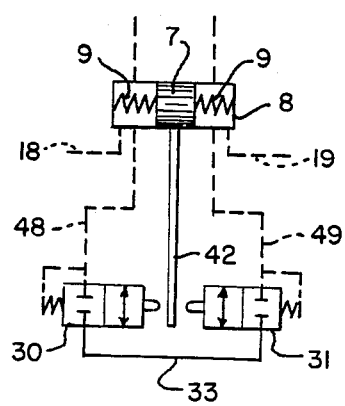
FIG. 2 shows a somewhat modified detail in larger scale.

The mode of operation is as follows: during normal operation with the loading of one of the two control pressure lines 18 or 19 with control pressure the final control element 6 of the pump 3 is shifted so that it connects the one of the two control pressure lines 18 and 19 that is carrying the lower pressure with the line 34, in which case if the pressure that prevails in the one of the two control pressure lines 18 and 19 also prevails in the line 33, the relief valve 36 maintains the line 34 pressureless. However, if the final control element 6 of pump 3 now remains for some time in this position, even though in the meantime the other of the two lines 18 and 19 carries the higher pressure, this one of the two control pressure lines 18 and 19 carrying the higher pressure becomes connected with the line 34 through one of the two shut-off valves 30 or 31 so that the pressure chamber on the spring side in the operating cylinder 25 is loaded with pressure and thus the servo piston 24 is shifted to the right in the drawing toward setting the primary power source 1 to a smaller power output. This setting persists until the final control element 6 has traveled through its neutral position into the position that is actually imposed by the control pressure in one of the two lines 18 or 19. Then the one of the two shut-off valves 30 or 31 that was open in the operating state described above is again closed and the line 34 is released through the valve 36, such that the setting of the servo piston 24 in the operating cylinder 25 is again determined only by the pressure prevailing in the line 27. FIG. 2 shows the operating cylinder 8 with the servo piston 7 and the two springs 9 on a larger scale. The arm 42 connected directly with the servo piston 7 in this case corresponds essentially to the arm 32 according to FIG. 1. The two lines 49 and 48 appear here at the site of the two lines 28 and 29 each connected to one of the control pressure lines 18 and 19 according to FIG. 1; in this case they are not connected directly to one of the two control pressure lines 18 and 19, but indirectly through one of the two pressure chambers in the receiver cylinder 8.

Figure 3:
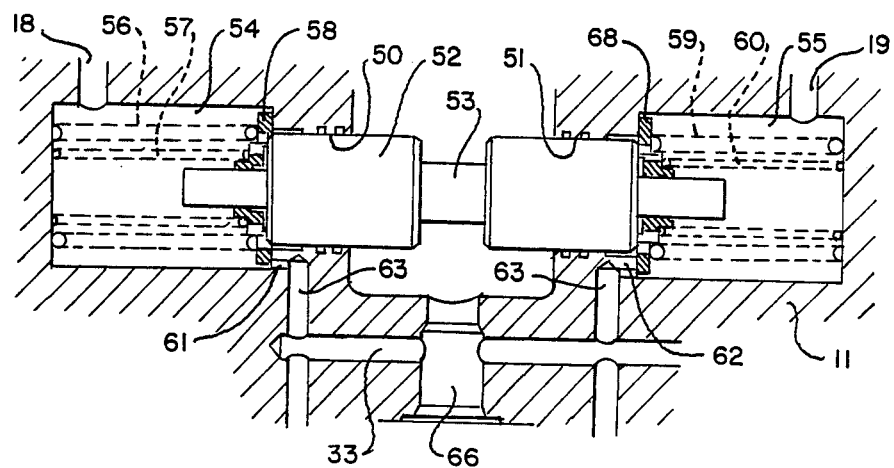
FIG. 3 shows a structural detail in cross section.

Two mutually coaxial bores 50 and 51 are provided in the housing cover 11 in FIG. 3; the receiver piston 52, which has an annular groove 53 in the middle, which serves for connection with the valve 16, 17 (not shown in FIG. 3), is capable of sliding in a sealed manner in the bores 50 and 51. A pressure chamber 54 that is connected to the control pressure line 18 is connected to the outside at the bore 50, and accordingly a pressure chamber 55 that is connected to the control pressure line 19 is connected to the outside at the bore 51. Two springs 56 and 57 that are supported against a spring plate 58 are located in the pressure chamber 54. In like manner, two springs 59 and 60 that are supported against a spring plate 68 are located in the pressure chamber 55. A bore 61 that empties into the prssure chamber 54 is provided in the housing cover 11 and a housing bore 62 that empties into the pressure chamber 55 is also provided. One of the spring plates 58 or 68 lies against each of these two mouths. The line 33, which leads to a longitudinal bore 66 in which the valve 36 is located and to which the line 34 (not shown) is connected, is connected through a connecting bore 63 to the two bores 61 and 62.

During normal operation, if a control pressure is present in the line 19, the receiver piston 52 is shifted against the force of the springs 56 and 57 to the left in the drawing, with the result that the spring plate 68 lies against the mouth of the bore 62 and closes it off, while the spring plate 58 is raised from the mouth of the bore 61 by the left-hand end face of the receiver piston 52 so that the control pressure line 18 is connected through the pressure chamber 54 with the bore 61 and through the latter with the line 33 so that the pressure that prevails in the control pressure line 18 also prevails in the line 33, i.e., the lower pressure. However, if the control pressure now drops very rapidly in the line 19 and the control pressure is increased in the line 18, the receiver piston is not able to follow this movement as rapidly due to the masses that have to be moved out by it, with the result that the higher pressure prevails in the control pressure chamber 54, while the receiver piston 52 is still shifted to the left in the drawing and thus the spring plate 58 is lifted from the mouth of the bore 61, with the additional result that the pressure prevailing in the pressure chamber 54 also prevails through the bore 61 and the bore 63 in the line 33 until the receiver body 52 has shifted far enough to the right in the drawing that the spring plate 58 lies in a sealing manner against the mouth of the bore 61.

If an additional power consumer is present in the drive system, which is driven by the same primary power source 1, a control pressure is produced by means of an additional control pressure sender in controlling this additional power consumer and a pressure-dependent reversing valve is connected to the line 27. The outlet of this valve is connected with the operating cylinder and its inlets are each connected to a control pressure line.

While we have set out certain preferred practices and embodiments of this invention in the foregoing specification, it will be obvious that the invention may be otherwise embodied within the scope of the following claims.

We claim:

1. In a control for a drive assembly such as a power vehicle having a primary power source, an adjusting means for the power source connected with a spring loaded piston movable in an operating cylinder loaded with a control pressure fluid on the side of the piston opposite the spring and a hydrostatic transmission, driven by said power source, which transmission is adjustable in opposite directions of output rotation, a regulating unit for said transmission, a servo piston connected to said regulating unit and slidable in a servo operating cylinder, a control valve controlling the pressure in said servo operating cylinder, a receiver piston connected with said control valve and slidable in a receiving cylinder having pressure chambers on opposite sides of said receiver piston, one of which chambers is capable of being loaded with an arbitrarily adjustable control pressure, first means for applying an arbitrarily adjustable control pressure to said receiver piston chamber, second means for applying a control pressure to the spring loaded piston at the adjusting means for the power source, said second means for applying a control pressure being dependent on the control pressure of the first means, the improvement comprising a final control element on said transmission, a normally closed shut-off valve means having two oppposing elements controlled by the position of the regulating unit for said transmission, said shut-off valve means being connected to the control pressure chambers of the receiving cylinder and engaged by lever means on the final control element for bypassing fluid from one of the receiver chambers, and a connection from said shut-off valve means to the adjusting means of the power source to reduce the speed of said power source until the shut-off valve means closes.

2. A control as claimed in claim 1 wherein the shut-off valve means is a pair of spaced valve means on opposite sides of a lever means on the final control element which moves with the final control element to operatively engage one of said shut-off valves.

3. A control according to claims 1 or 2, in which the receiver piston is designed as a plunger piston and is supported against a spring on both sides through spring plates that lie against the receiver piston, said spring plates being supported with an edge surface projecting over the outer periphery of the receiver piston against a flange surface of the housing, a fluid line connecting the two opposing elements of the shut-off valve and the flange surface on each side of the plunger pistion, and wherein the spring plate is designed as a valve body to lie tightly against the flange surface.

4. A control according to claims 1 or 2 in a transmission unit in which the pressure chamber of the receiving cylinder that is not loaded with control pressure is loaded with a prescribed pressure that is less than the control pressure, and further comprising a release valve controlled by the pressure in the line beyond the shut-off valves is located in the line leading to the spring-side pressure chamber of the operating cylinder assigned to the primary power source.

5. A control according to claims 1 or 2 in a transmission unit in which the pressure chamber of the receiving cylinder that is not loaded with control pressure is relieved of pressure, and further comprising a restrictor located in the line leading to the spring-side pressure chamber of the operating cylinder assigned to the primary power source.

* * * * *

UNITED STATES PATENT AND TRADEMARK OFFICE
CERTIFICATE OF CORRECTION

PATENT NO. : 4,742,676

DATED : May 10, 1988

INVENTOR(S) : Kropp et al.

It is certified that error appears in the above-identified patent and that said Letters Patent is hereby corrected as shown below:

Column 2, line 31, after "device" insert --.--.

Column 4, line 33, change "and.31" to --and 31--.

Column 4, line 44, change "cohtrol" to --control--.

Column 6, line 50, change "pistion," to --piston,--.

Signed and Sealed this

Twenty-seventh Day of December, 1988

Attest:

DONALD J. QUIGG

*Attesting Officer*  *Commissioner of Patents and Trademarks*